United States Patent [19]

Paschkis

[11] Patent Number: 4,853,715
[45] Date of Patent: Aug. 1, 1989

[54] PLOTTER HEAD CONTROL DEVICE

[75] Inventor: Albert E. Paschkis, Gwynedd Valley, Pa.

[73] Assignee: Numonics Corporation, Montgomeryville, Pa.

[21] Appl. No.: 207,862

[22] Filed: Jun. 17, 1988

[51] Int. Cl.⁴ .......................... G01D 9/42; F16H 15/00
[52] U.S. Cl. ................................ 346/139 R; 346/141; 74/202; 74/205
[58] Field of Search ...................... 346/139 R, 49, 141; 74/202, 203, 204, 205

[56] References Cited

U.S. PATENT DOCUMENTS

| | | | |
|---|---|---|---|
| 648,106 | 4/1900 | Heinz | 74/202 |
| 4,758,102 | 7/1988 | Onoda | 346/139 R |

*Primary Examiner*—E. A. Goldberg
*Assistant Examiner*—Mark Reinhart
*Attorney, Agent, or Firm*—Gregory J. Gore

[57] ABSTRACT

A pen plotter employs a cable-driven carriage which carries the writing pen and includes a pen-lift mechanism. A shifting idler pulley system located at one side of the plotter returns a pair of drive cables from the opposite side of the carriage to a rotatable drive drum located on the opposite side. The idler pulleys are shiftable equally and in opposite directions toward and away from the pen carriage. One cable is connected to the carriage by being tensively trained about a pen-lift mechanism drive wheel on the carriage. Shifting the idler pulleys causes said drive wheel to rotate without affecting the lateral position of the pen carriage and, therefore, the shifter mechanism independently controls the up/down motion of the writing pen. One drive cable, therefore, accomplishes the functions of both pen carriage movement and writing pen up/down motion control.

9 Claims, 7 Drawing Sheets

PLOTTER HEAD CONTROL DEVICE

FIELD OF THE INVENTION

This invention relates to an X-Y printer having a writing pen for high-speed plotting.

BACKGROUND OF THE INVENTION

High-speed plotters require a fast and highly controlled movement of a writing pen. Most commonly, the pen is supported on a carriage which is mounted on transverse guide rails for back and forth movement in a lateral direction while the plotter web, such as a paper sheet, is independently moved back and forth in a direction substantially perpendicular to the carriage movement. Motion along these two axes in combination with up/down pen control permits the creation of accurate line art drawings and lettering on the web.

Controlled up/down motion of the pen with respect to the web is critical for high-speed plotter operation. Present methods of pen control include either a solenoid or a force coil to effect pen up/down motion. However, the use of a solenoid makes it extremely difficult to control the pen motion to provide a soft landing of the pen tip against the web. The use of a force coil overcomes this difficulty, but mounting the force coil structure on a movable pen carriage adds substantial mass to the moving systems and requires electrical connection to the carriage. Furthermore, effective control of pen up/down motion using a force coil requires an expensive closed loop servo controller which requires pen position and velocity feedback.

Other methods of up/down pen control include systems where the actuation means are located remote to the carriage and mounted to one side on the plotter frame. The actuator is then connected to the carriage by way of a mechanism such as a push bar which extends across the entire width of the plotter and is parallel to the guide rails. Prior art mechanical systems such as these which are remote to the carriage, add complexity and extra mass to the moving systems, and therefore are slow. Furthermore, there is a problem with accuracy and repeatability since there is often misalignment between the push bar and the guide rails.

There is, therefore, a need in the plotter art for a method of fast and accurate up/down pen control which is economical and does not unduly increase the complexity of the plotter.

SUMMARY OF THE INVENTION

In order to meet the needs in the art as explained above, a novel mechanical pen motion control system has been devised. The present invention employs a cable driven carriage which carries the writing pen and includes a penlift mechanism. A unique shifting idler pulley system located at one side of the plotter returns a pair of drive cables from the opposite side of the carriage to a rotating drive drum. Since the idler pulleys are already present with a typical cable driven carriage, this new system uses a minimum of additional structures proving to be both fast and accurate.

More specifically, a rail-mounted carriage is provided which has left and right-side drive cables driven by a drum on the right side of the plotter frame. The cables, each in the form of a loop with upper and lower runs, are attached to and wound in opposite directions about drive drum. On the left side of the plotter frame, a pair of parallel and vertically disposed shiftable idler pulleys maintain a parallel relationship between the upper and lower runs of the left side drive cables and reverses their direction, returning them to the drive drum at the right. The right side cable travels directly from the right side of the pen carriage to the drive drum. Provision is made to tension the drive cables equally to eliminate any loss of motion between rotation of drive drum and resulting per carriage movement to the left or right.

By way of a unique mechanism which will be more fully described, the idler pulleys are shifted simultaneously, equally, and in opposite directions toward and away from the pen carriage. In this way, the individual upper and lower left side cable runs shift relative to the pen carriage without any change in the overall left side drive cable length or tension. Therefore, shifting the idler pulleys does not effect the lateral position of the pen carriage but causes redistribution of the left side drive cable between its upper and lower runs. This results in the rotation of the left side pulley located on the carriage about which this cable is trained. The left-side carriage pulley includes a lever affixed to it, to effect the up/down motion of the pen.

The idler pulleys are shifted by the use of a unique mechanism which transfers rotation about an axis into equal and opposite parallel movement of the idler pulleys. This mechanism employs a four-bar linkage secured at two pivot points, at least one of which has a fixed axle to move the linkage.

It is therefore an object of this invention to create a mechanism for a plotter which provides an up/down pen motion which is fast, accurate and repeatable. It is another object of this invention to modulate the pen up/down motion in order to effect a soft landing of the pen on the plotting web. It is yet another object of the present invention to control the pen pressure against the web. It is yet another object of this invention to provide pen pressure control which may be regulated by a controller which is external to the pen lift mechanism.

Other objects will be apparent from the drawings and the following description of the preferred embodiment of the present invention.

DESCRIPTION OF THE PREFERRED EMBODIMENT

Figure 1:
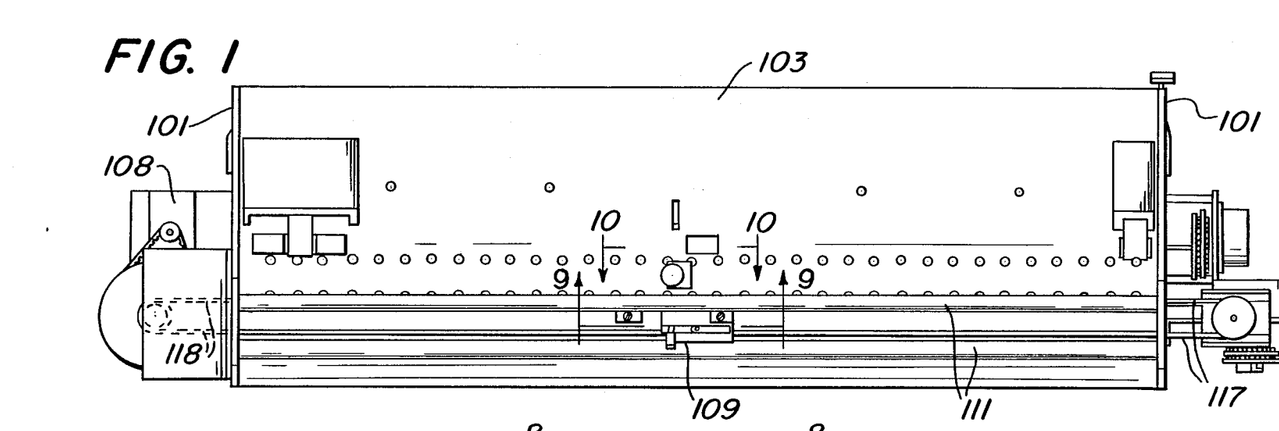
FIG. 1 shows a top view of a plotter.
Figure 2:
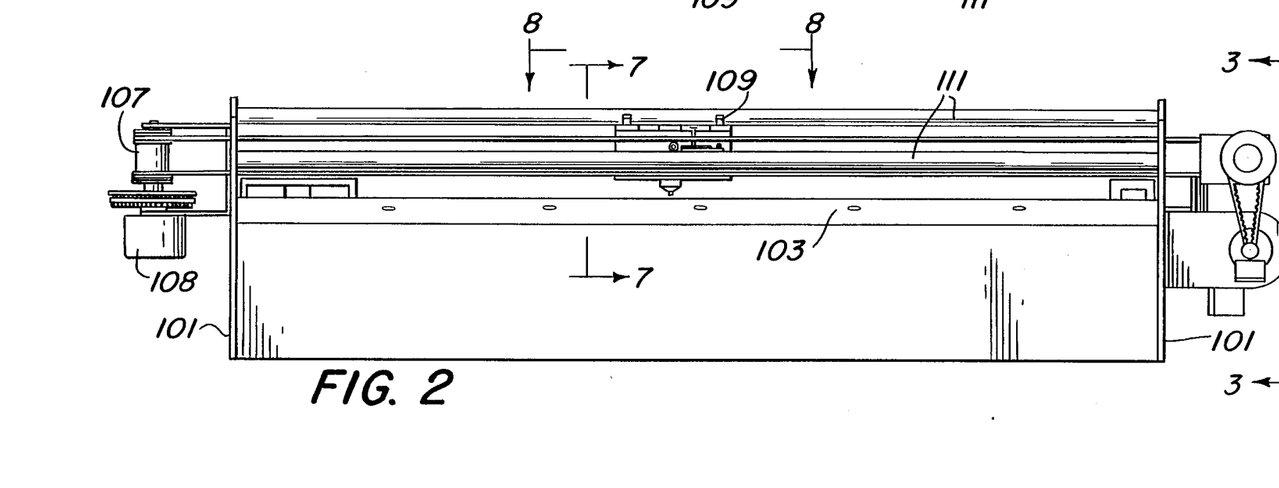
FIG. 2 is a rear view of the plotter.

Referring now to FIGS. 1 and 2, frame structure 101 provides a base for the various plotter components including platform 103 which supports a web (not shown), such as a paper sheet. Cable drive drum 107 controls lateral movement of the pen carriage 109 through drive cable segments 117 and 118 secured to opposite sides of the carriage. The cable drive drum is rotated by motor 108. Bilateral control is provided by these two opposing drive cables, each cable being formed into a non-continuous loop having an upper and a lower run. One cable segment 118 forms one pair of runs and is attached to the right side of the pen carriage. A second cable 117 forms a second pair of runs and is attached to the left side of the pen carriage via idler pulleys 401 and 403 shown in FIGS. 4 and 5 which reverse the direction of the cable and return it to the drive drum. The cables are wound in opposite directions about the drive drum. The pen carriage 109 is accurately positioned and supported by guide rails 111. It will be well understood by those of skill in the art that this arrangement provides positive lateral control of pen carriage movement to the right or to the left by rotation of cable drive drum 107.

Figure 3:
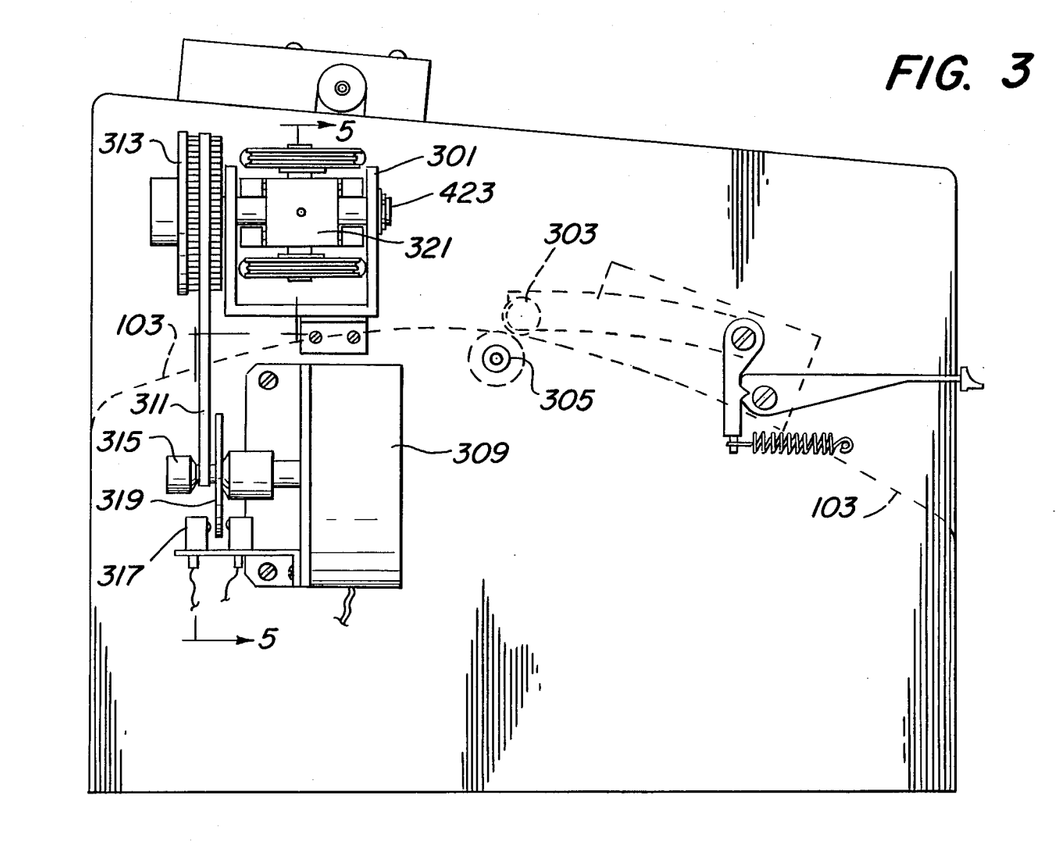
FIG. 3 is a side view showing the drive details of the shifting idler pulleys.

Referring now to FIG. 3, a left-side view of the plotter shows the idler pulley shifter assembly secured to the frame 101 by U-shaped support yoke 301. Idler pulley shifter drive means 309 is shown connected by way of a belt 311 and corresponding cogs 313 and 315. Optical sensing means 317 in combination with rotating disk 319 provides accurate position indication of the pulley shifter mechanism and hence position of the pen tip. This pen position sensor provides input to a programmable controller for modulating the movement of the pen tip. The controller is also connected to the drive drum motor 108 (shown in FIG. 2). It will be understood that pen tip motion may be controlled by appropriate programming so that a soft landing of the pen tip on the web is ensured.

Although it is not of specific importance to the present invention, as shown in FIG. 3, web drive means including web drive rollers 303 and 305 which are driven by motor means (not shown) to move said web back and forth in a longitudinal direction.

Figure 4:
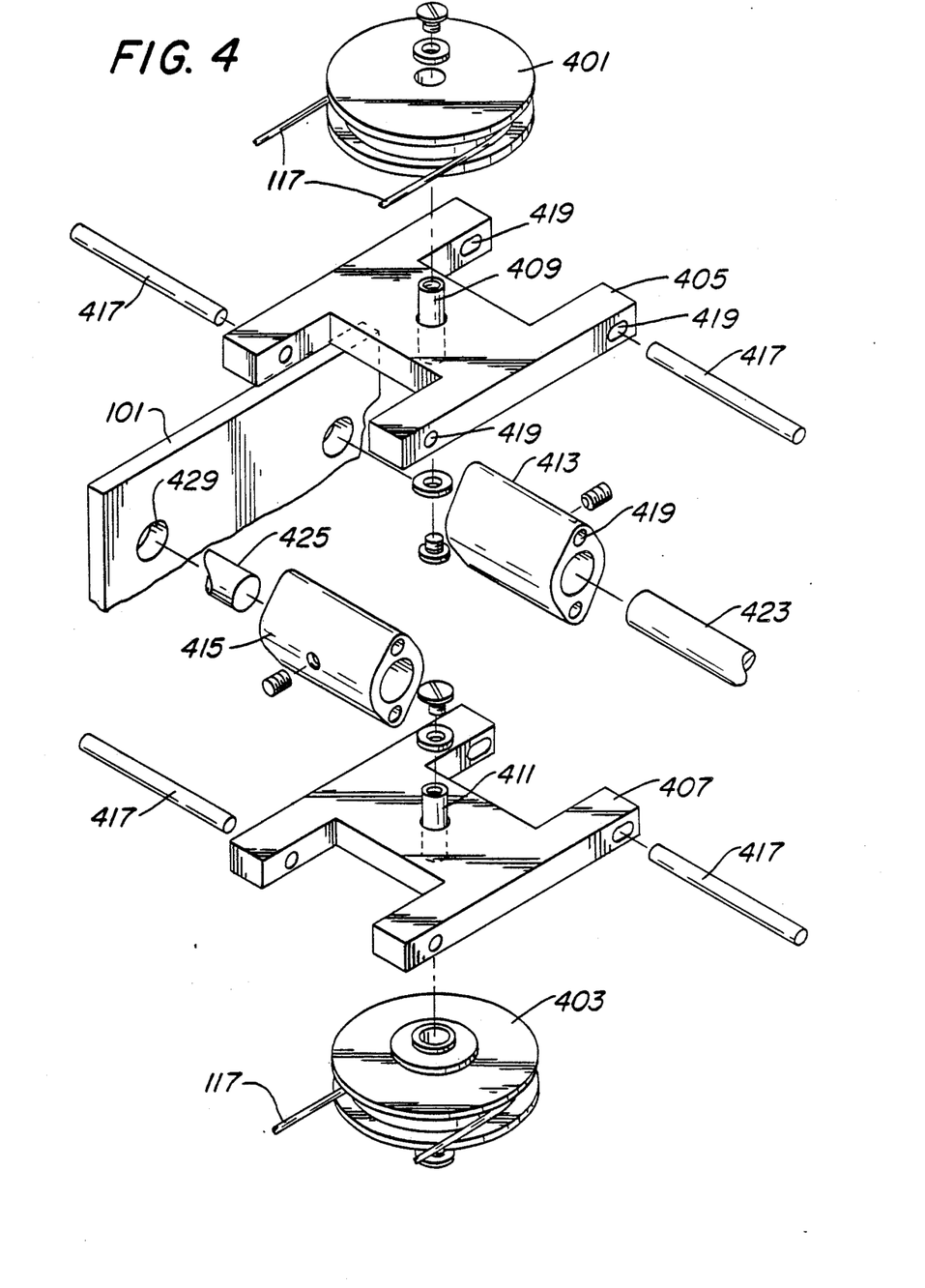
FIG. 4 is an exploded diagram which shows the elements of the four-bar linkages which control the pulleys in movement.

Referring now to FIG. 4, an exploded isometric view of the idler pulley shifter shows vertically dispose upper idler pulley 401 and vertically disposed lower idler pulley 403 supported by upper and lower H-plates 405 and 407, respectively. Fixed axle means 409 and 411 secure said idler pulleys to the H-plates. Top and lower H-plates are interconnected through linkage members 413 and 415 by four pins 417 cooperating with apertures 419 in the H plates. These mechanical relations form a four-bar linkage with the upper and lower parallel linkage members supplied by H-plates 405 and 407. The ends of interconnecting linkage member 415 and 413 are pinned to opposite sides of said H-plates and members 415 and 413 therefore represent the other two elements to form said four-bar linkage. This mechanism is supported on frame member 301 by live axles 423 and 425 which rotate within apertures 429 in support yoke 301.

It will be readily understood from those of ordinary skill in the mechanical arts that rotation of axle 423 will result in the lateral shifting of idler pulleys 401 and 403 in equal amounts but in opposite direction. Furthermore, the pulleys will be maintained in parallel.

Figure 5:
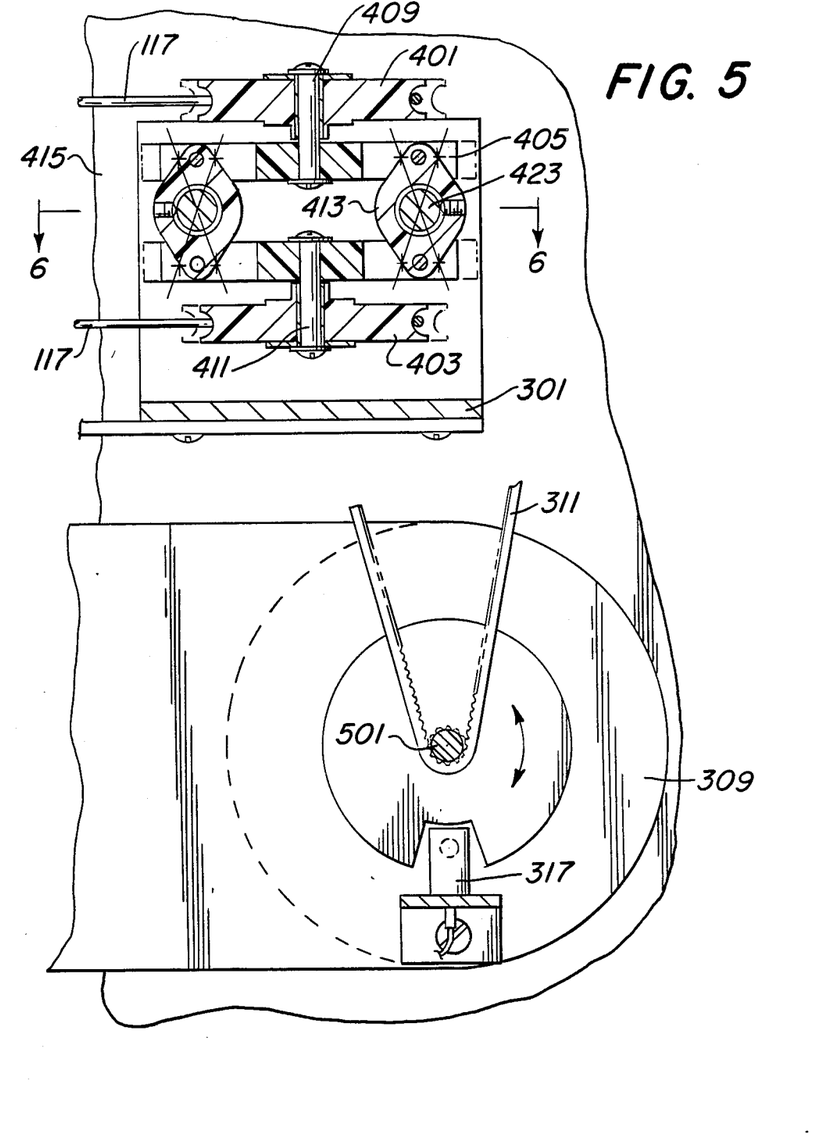
FIG. 5 is a sectional view of FIG. 3 showing details of the idler pulley shifter.

Referring now to FIG. 5, drive means 309 transmit rotation to axle 423 by motor shaft 501 through drive belt 311.

Figure 6:
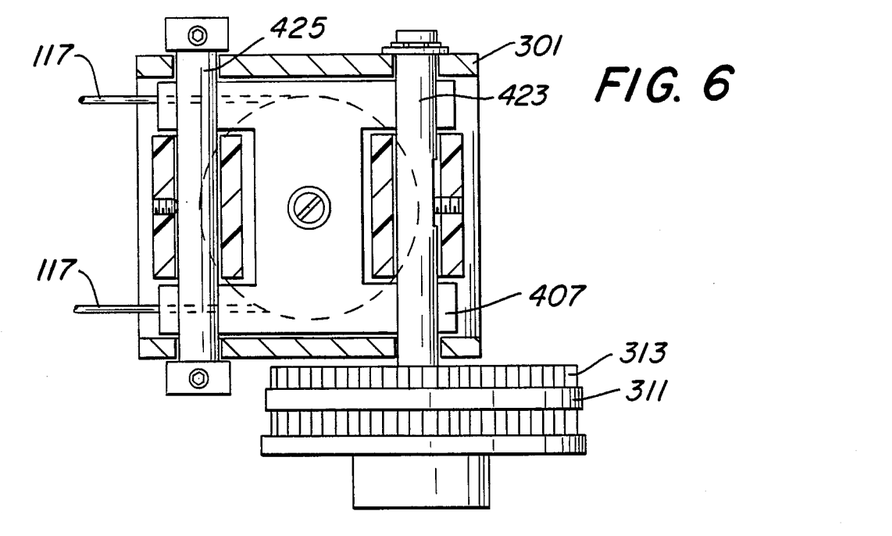
FIG. 6 is a sectional view taken from FIG. 5.

FIG. 6 shows additional details of the pulley shifter mechanism with live axles 425 and 423 supported by U-shaped support yoke 301.

Figure 7:
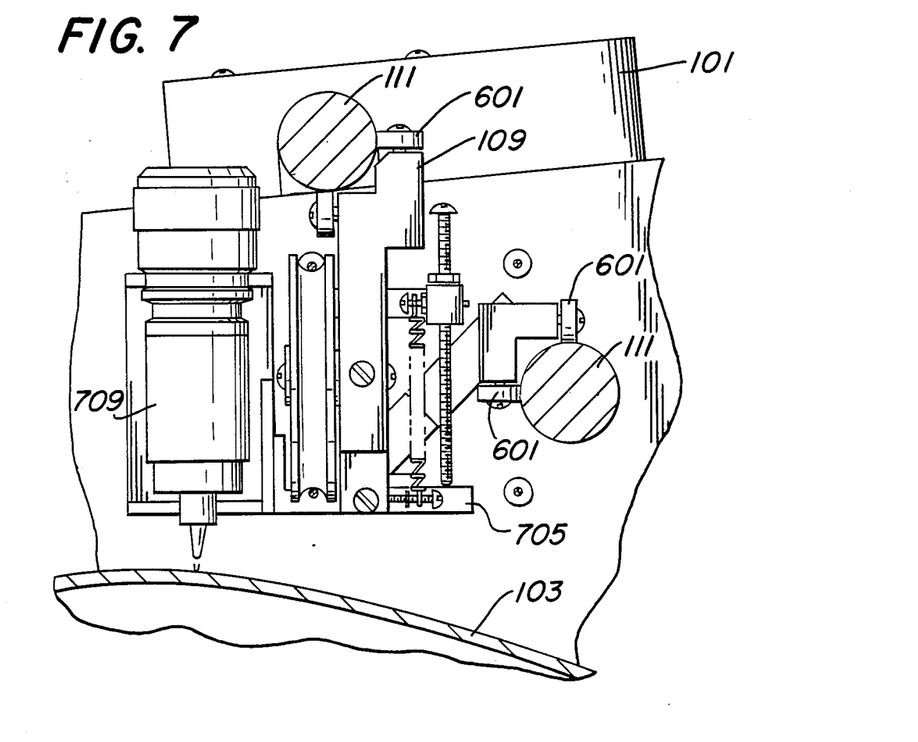
FIG. 7 is a side sectional view taken from FIG. 2.

Referring now to FIGS. 7, 8, 9, and 10, details of the pen carriage are shown. Referring now to FIG. 7, the carriage 109 is supported by guide rails 111. Carriage-mounted carriage guide rollers 601 provide for free movement of the carriage laterally while securing the carriage to the guide rails against movement in all other directions. Pen 709 is connected to one end of rocker arm 705 which is more clearly depicted in FIG. 8.

Figure 10:
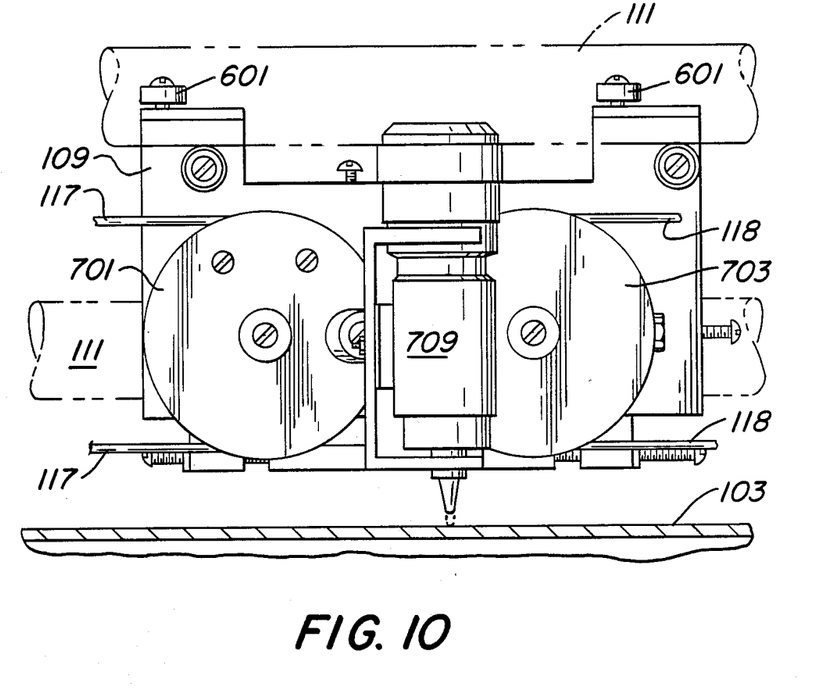
FIG. 10 is a front view of the pen carriage.

As shown in FIG. 10, the drive cable means are divided into two separate cable segments 117 and 118. Each segment represents a cable loop which begins and terminates at the cable drive drum 107 at the right side of the plotter frame (not shown in this figure, but shown in FIGS. 1 and 2). Left-side cable segment 117 is trained about pen drive pulley 701 and provides force transmission to effect movement of the pen carriage when both runs are tensed equally in the same direction (when the cable drum rotates). Right-side cable 118 provides pen carriage motion in the opposite direction through carriage idler pulley 703. Carriage pulley 703 is idle and acts only to connect cable segment 118 to the carriage and also to maintain the upper and lower runs of cable segment 118 parallel.

As previously described, lateral shifting of the idler pulleys will not change the overall cable length of cable segments 117 and 118 and, hence, will not change the tension in the system, but will impart a rotational motion to pen drive pulley 701 about which cable segment 117 is trained. Hence, cable segment 117 controls two separate functions independently; lateral carriage movement caused by drive drum rotation, and rotation of pen drive pulley 701 caused by shifting of the idler pulleys.

Figure 8:
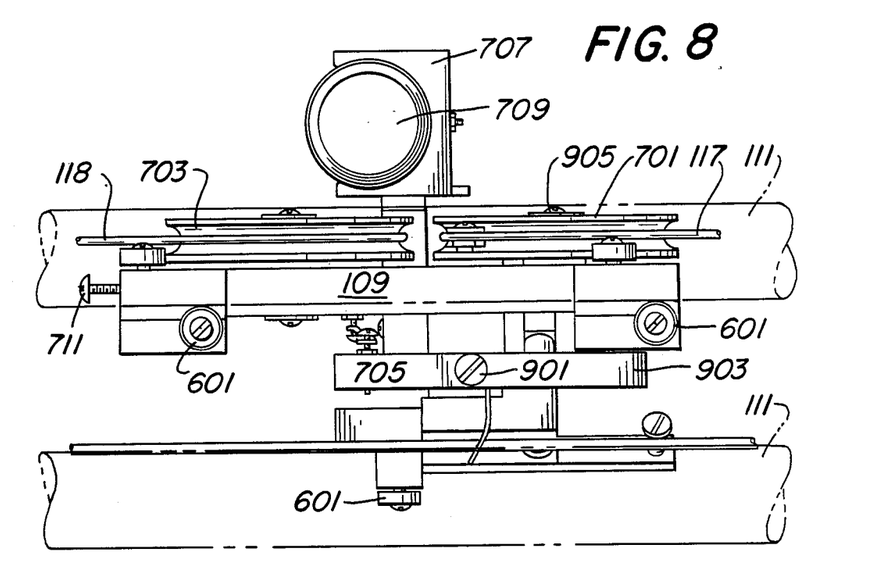
FIG. 8 is a top view of the pen carriage.
Figure 9:
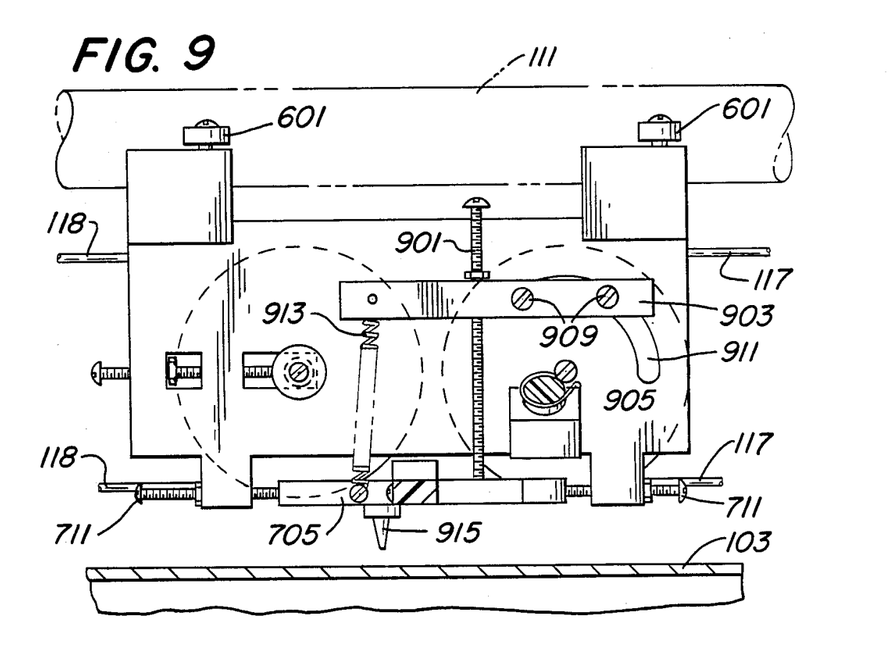
FIG. 9 is a rear view of the pen carriage showing in detail the lift mechanism.

FIGS. 8 and 9 show details of the pen drive mechanism which is connected to pen drive pulley 701. As shown in FIG. 8, pen holder 707 includes pen rocker arm 705 which passes transversely across the bottom of carriage 109 and has a fulcrum pivot determined by threaded axle means 711. An upward lifting motion of the pen 709 is achieved by downward force applied to the opposite end of the pen rocker arm at the rear of the carriage by threaded extension arm 901. Extension arm 901 is rigidly affixed to cooperating pulley lever arm 903 which pivots about shaft 905 in a plane substantially perpendicular to the plane of motion described by pen rocker arm 705. Pulley lever arm 903 is rigidly affixed to pen drive pulley 701 by two pin members 909 which pass through arcuate carriage frame slot 911. Spring 913 maintains extension arm 901 in contacting cooperation with pen rocker arm 705.

The above-described mechanism interconnects the carriage pen drive pulley 701 and the writing pen so that the rotation of the pen drive pulley causes up/-down motion of the pen. In this way the idler shifter control means can regulate the pen motion while the cable drive drum will independently control lateral movement of the pen carriage. Accordingly, coordination of both mechanisms by a suitable controller may work to provide any desired combination of pen height and lateral pen carriage position.

These structures provide desired mechanical linkage between actuation of the idler pulley shifter and the pen whereby pen lift and drop may be accurately controlled. There is a direct mechanical link to the pen rocker arm in one direction of rotation of the pen drive pulley, while in the opposite direction of rotation, force is transmitted to the pen rocker arm by spring 913 as soon as pen down motion is stopped by contacting the web. Hence, the pen lift is positively driven through compression forces in arm 901 while writing pressure on the pen tip 915 cannot exceed force transmitted by spring 913. Accordingly, pen up/down motion is accurately controlled and pen point bounce is mitigated.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. An X-Y plotter, comprising;
   a. a frame,
   b. a platform attached to said frame for supporting a web,
   c. a pen carriage slideably supported above said frame and said web movable in opposite lateral directions,
   d. a pen pivotally affixed to said pen carriage, movable between a first position of web contact and a second retracted position,
   e. first and second cable segments connected to opposite sides of said pen carriage,
   f. a cable drive drum connected to said first and second cable segments,
   g. two idler pulleys mounted to one side of said platform for controlling the direction and movement of said first cable segment,
   h. a pulley shifter affixed to said idler pulleys and including mechanical relations whereby said idler pulleys are simultaneously moved in equal but opposite directions, toward and away from said carriage,
   i. pen lift means affixed to said carriage and actuated by said first cable segment by shifting said idler pulleys,
   j. first drive means for actuating said pulley shifter,
   k. second drive means for rotating said cable drive drum.

2. The X-Y plotter of claim 1 wherein said first and second cable segments form separate cable loops having upper and lower runs.

3. The X-Y plotter of claim 2 wherein said first and second cable segments are wound in opposite directions about said cable drive drum.

4. The X-Y plotter of claim 3 further including a carriage-mounted pen drive pulley which is actuated by said first cable segment and connected to said pen for moving said pen between said first and said second pen positions.

5. The X-Y plotter of claim 4 wherein said pen is resiliently biased against downward movement by said pen lift mechanism.

6. The X-Y plotter of claim 5 further including a programmable controller connected to said first and said second drive means for simultaneously controlling lateral and vertical pen positions.

7. The X-Y plotter of claim 6 further described in that said pulley shifter includes a four-bar linkage which interconnects said idler pulleys.

8. The X-Y plotter of claim 7 further including guide rails affixed to said frame for supporting said carriage.

9. The X-Y plotter of claim 8 further including a rocker arm pivotally affixed to said carriage and holding said pen at one end and contacting said pen lift mechanism at the opposite end.

* * * * *